(12) United States Patent
Rao et al.

(10) Patent No.: US 11,671,529 B2
(45) Date of Patent: *Jun. 6, 2023

(54) CROSS-CHANNEL CONFIGURABLE NAVIGATION

(71) Applicant: Capital One Services, LLC, McLean, VA (US)

(72) Inventors: Bhavani R. Rao, McLean, VA (US); Mark W. Zehr, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/560,802

(22) Filed: Dec. 23, 2021

(65) Prior Publication Data

US 2022/0116498 A1    Apr. 14, 2022

Related U.S. Application Data

(63) Continuation of application No. 16/723,926, filed on Dec. 20, 2019, now Pat. No. 11,212,384.

(51) Int. Cl.
| | | |
|---|---|---|
| *H04M 1/72445* | (2021.01) | |
| *G06F 16/958* | (2019.01) | |
| *H04M 1/72454* | (2021.01) | |
| *H04M 1/72457* | (2021.01) | |

(52) U.S. Cl.
CPC ...... *H04M 1/72445* (2021.01); *G06F 16/958* (2019.01); *H04M 1/72454* (2021.01); *H04M 1/72457* (2021.01)

(58) Field of Classification Search
CPC ......... H04M 1/72445; H04M 1/72454; H04M 1/72457; G06F 16/958; G06F 8/658; G06F 9/451
See application file for complete search history.

(56) References Cited

U.S. PATENT DOCUMENTS

| | | |
|---|---|---|
| 6,336,137 B1 | 1/2002 | Lee et al. |
| 6,633,315 B1 | 10/2003 | Sobeski et al. |
| 8,813,028 B2 | 8/2014 | Farooqi |
| 2006/0123347 A1 | 6/2006 | Hewitt et al. |
| 2006/0235548 A1 | 10/2006 | Gaudette |

(Continued)

*Primary Examiner* — Jennifer N Welch
*Assistant Examiner* — KC Chen
(74) *Attorney, Agent, or Firm* — Greenberg Traurig, LLP

(57) ABSTRACT

A deployment server system may dynamically generate a user interface for a mobile application. The mobile application may comprise a set of interface pages and a set of workflow steps, and each workflow step may define a transition from a first interface page to a second interface page. The deployment server system obtains, from a mobile device, a workflow step request. The workflow step may include a transition from the interface page and transition data determined based on the interface page. The deployment server system determines a second interface page based on the interface page and transition data indicated in the workflow step request, generates a unit test for the second interface page. The deployment system validates the workflow step request by testing the second interface page using the generated unit test, and based on successfully validating the workflow step request, the deployment server may transmit the second interface page.

20 Claims, 7 Drawing Sheets

(56) References Cited

U.S. PATENT DOCUMENTS

| | | |
|---|---|---|
| 2007/0130546 A1 | 6/2007 | Harris et al. |
| 2009/0327887 A1 | 12/2009 | Argue et al. |
| 2011/0078556 A1 | 3/2011 | Prasad et al. |
| 2011/0216889 A1 | 9/2011 | Howell et al. |
| 2012/0185821 A1 | 7/2012 | Yaseen et al. |
| 2013/0297670 A1 | 11/2013 | Lundberg et al. |
| 2016/0055126 A1 | 2/2016 | Doerr et al. |
| 2016/0057163 A1 | 2/2016 | Boffa et al. |
| 2018/0052666 A1 | 2/2018 | Zhang et al. |
| 2020/0356609 A1* | 11/2020 | Choi ................... G06F 16/40 |

* cited by examiner

CROSS-CHANNEL CONFIGURABLE NAVIGATION

FIELD OF USE

Aspects of the disclosure relate generally to user interfaces and more specifically to dynamically generated user interfaces.

BACKGROUND

Current mobile applications and browser based systems lack the ability to dynamically create and modify user flows in a complex system that is seamless, transparent, and expeditious. Further, user flows resulting in a modified or new state typically require redeployment of the application. Current systems also lack the ability to back-end test requested user interfaces on a dynamic basis.

Aspects described herein may address these and other problems, and generally improve the quality, efficiency, and speed of dynamically generating a user interface in a mobile application through the use of a deployment server system that dynamically generates user interfaces, validates the requested user interface, and transmits the user interface without redeploying the mobile application.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below. Corresponding apparatus, systems, and computer-readable media are also within the scope of the disclosure.

Deployment server systems in accordance with aspects of the invention may include a processor and a memory that is in communication with the processor storing instructions. The instructions, when executed by the processor, may cause the deployment of the server system to transmit, to a mobile device, an interface page for a mobile application. The mobile application may comprise a set of interface pages and a set of workflow steps, and each workflow step may define a transition from a first interface page to a second interface page. The deployment server system obtains, from a mobile device, a workflow step request. The workflow step may include a transition from the interface page and transition data determined based on the interface page. The deployment server system determines a second interface page based on the interface page and the transition data indicated in the workflow step request, and the second interface page may comprise input data requirements. The deployment server system may generate a unit test for the second interface page based on the interface page, the transition data, and the input data requirements. The deployment system validates the workflow step request by testing the second interface page using the generated unit test, and based on successfully validating the workflow step request, the deployment server may transmit the second interface page.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. In addition, it is to be understood that the phraseology and terminology used herein are for the purpose of description and should not be regarded as limiting. Rather, the phrases and terms used herein are to be given their broadest interpretation and meaning.

By way of introduction, aspects discussed herein relate to techniques and systems to dynamically generate a user interface for a mobile application. Conventional systems and methods in mobile applications typically include a pre-defined set of user interface screens that have been programmed to interact with each other in a statically mapped manner. In order to revise or modify the user interfaces, a new version of the mobile application would need to be coded, tested, compiled, and transmitted to the mobile device. Additionally, most mobile devices are only capable of executing mobile applications compiled in a single language. Resultantly, the mobile applications are incompatible between different mobile device platforms and environments. Existing systems also lack the ability to generate a unit test on the fly upon user request.

The methods and systems disclosed herein to dynamically generate a user interface for a mobile application are designed to rapidly adjust to the needs of a user. The systems and methods integrate various flows and states to enhance the user experience, and the systems and methods disclosed herein lack a domain specific language. In a variety of embodiments, a deployment server generates a unit test for the requested user interface, tests and validates the requested interface, and the deployment server system transmits the requested interface without redeploying the mobile application. Deployment server systems as described herein may also generate an appropriate unit test based upon the user's requested interface page. The server may test the determined interface page and upon validation the server will transmit the validated interface page to the mobile application. Deployment server systems are capable of integrating various languages across dissimilar devices in the generation of user interfaces.

Figure 1:
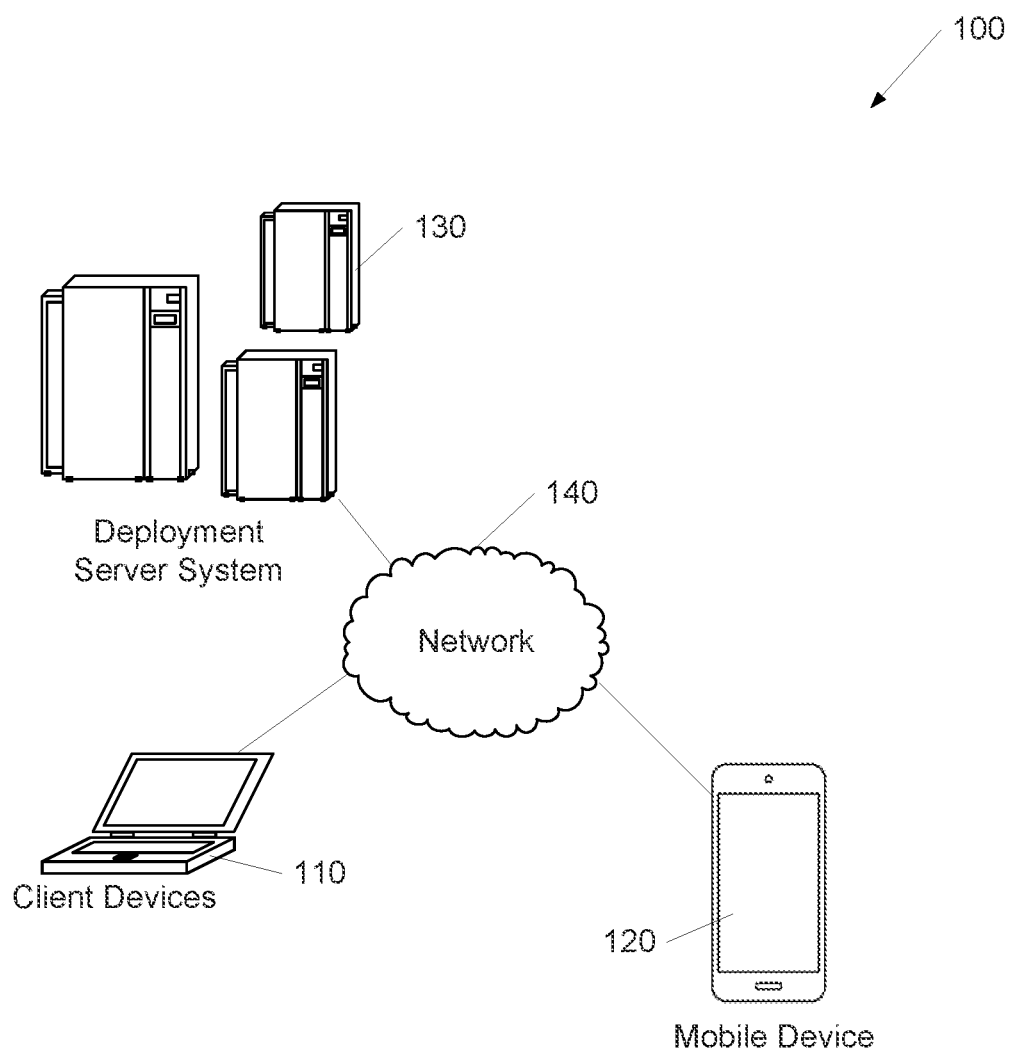
FIG. 1 illustrates an example of a deployment server system in which one or more aspects described herein may be implemented.

FIG. 1 illustrates an operating environment 100 in accordance with an embodiment of the invention. The operating environment 100 includes at least one client device 110, and/or at least one mobile device 120, and at least one deployment server system 130 in communication via a network 140. It will be appreciated that the network connections shown are illustrative and any means of establishing a communications link between the computers may be used. The existence of any of various network protocols such as TCP/IP, Ethernet, FTP, HTTP and the like, and of various wireless communication technologies such as GSM, CDMA, WiFi, and LTE, is presumed, and the various computing devices described herein may be configured to communicate using any of these network protocols or technologies. Any of the devices and systems described herein may be implemented, in whole or in part, using one or more computing devices described with respect to FIG. 2.

Client devices 110 and/or mobile device 120 may provide user interface requests to deployment server system 130 as described herein. Deployment server systems 130 may receive requests to dynamically generate user interfaces and process the requests according to a response to a user interface request as described herein. The network 140 may include a local area network (LAN), a wide area network (WAN), a wireless telecommunications network, and/or any other communication network or combination thereof.

Some or all of the data described herein may be stored using any of a variety of data storage mechanisms, such as databases. These databases may include, but are not limited to relational databases, hierarchical databases, distributed databases, in-memory databases, flat file databases, XML databases, NoSQL databases, graph databases, and/or a combination thereof. The data transferred to and from various computing devices in the operating environment 100 may include secure and sensitive data, such as confidential documents, customer personally identifiable information, and account data. It may be desirable to protect transmissions of such data using secure network protocols and encryption and/or to protect the integrity of the data when stored on the various computing devices. For example, a file-based integration scheme or a service-based integration scheme may be utilized for transmitting data between the various computing devices. Data may be transmitted using various network communication protocols. Secure data transmission protocols and/or encryption may be used in file transfers to protect the integrity of the data, for example, File Transfer Protocol (FTP), Secure File Transfer Protocol (SFTP), and/or Pretty Good Privacy (PGP) encryption. In many embodiments, one or more web services may be implemented within the various computing or mobile devices. Web services may be accessed by authorized external devices and users to support input, extraction, and manipulation of data between the various computing devices in the operating environment 100. Web services built to support a personalized display system may be cross-domain and/or cross-platform, and may be built for enterprise use. Data may be transmitted using the Secure Sockets Layer (SSL) or Transport Layer Security (TLS) protocol to provide secure connections between the computing devices. Web services may be implemented using the WS-Security standard, providing for secure SOAP messages using XML, encryption. Specialized hardware may be used to provide secure web services. For example, secure network appliances may include built-in features such as hardware-accelerated SSL and HTTPS, WS-Security, and/or firewalls. Such specialized hardware may be installed and configured in the operating environment 100 in front of one or more computing or mobile devices such that any external devices may communicate directly with the specialized hardware.

Figure 2:
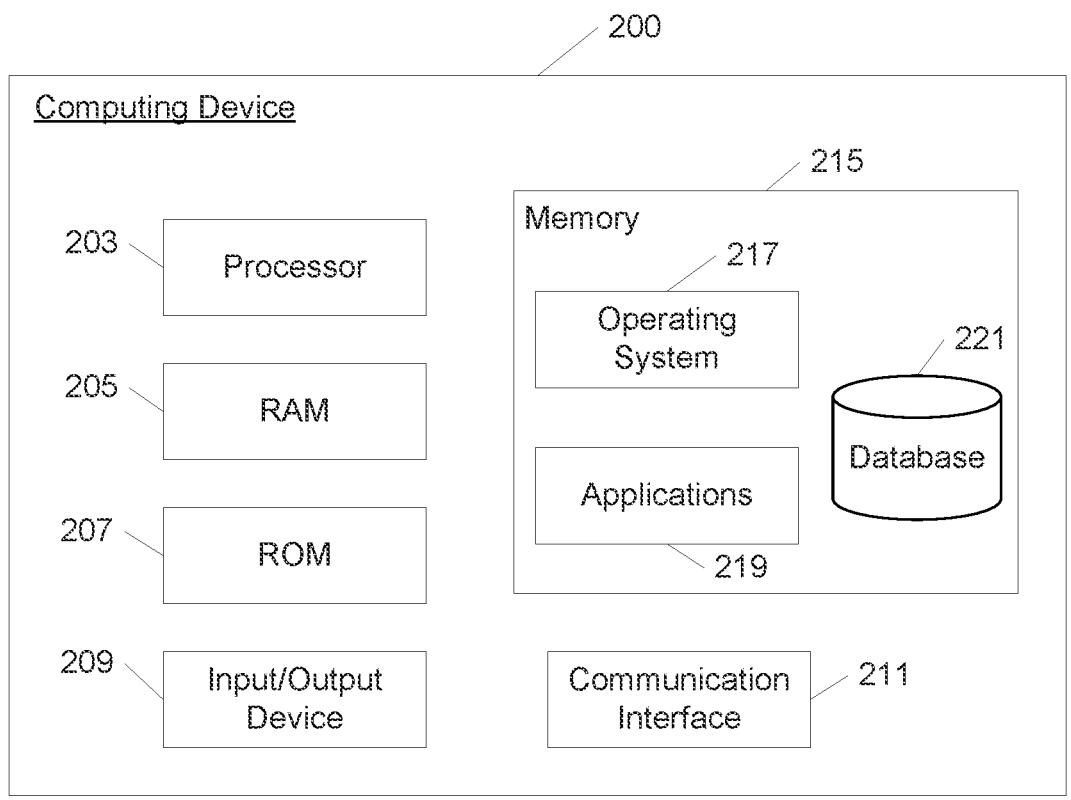
FIG. 2 illustrates an example computing device in accordance with one or more aspects described herein.

Turning now to FIG. 2, a computing device 200 in accordance with an embodiment of the invention is shown. The computing device 200 may include a processor 203 for controlling overall operation of the computing device 200 and its associated components, including RAM 205, ROM 207, input/output device 209, communication interface 211, and/or memory 215. A data bus may interconnect processor(s) 203, RAM 205, ROM 207, memory 215, I/O device 209, and/or communication interface 211. In some embodiments, computing device 200 may represent, be incorporated in, and/or include various devices such as a desktop computer, a computer server, a mobile device, such as a laptop computer, a tablet computer, a smart phone, any other types of mobile computing devices, and the like, and/or any other type of data processing device.

Input/output (I/O) device 209 may include a microphone, keypad, touch screen, and/or stylus through which a user of the computing device 200 may provide input, and may also include one or more of a speaker for providing audio output and a video display device for providing textual, audiovisual, and/or graphical output. Communication interface 211 may include one or more transceivers, digital signal processors, and/or additional circuitry and software for communicating via any network, wired or wireless, using any protocol as described herein. Software may be stored within memory 215 to provide instructions to processor 203 allowing computing device 200 to perform various actions. For example, memory 215 may store software used by the computing device 200, such as an operating system 217, application programs 219, and/or an associated internal database 221. The various hardware memory units in memory 215 may include volatile and nonvolatile, removable and non-removable media implemented in any method or technology for storage of information such as computer-readable instructions, data structures, program modules, or other data. Memory 215 may include one or more physical persistent memory devices and/or one or more non-persistent memory devices. Memory 215 may include, but is not limited to, random access memory (RAM) 205, read only memory (ROM) 207, electronically erasable programmable read only memory (EEPROM), flash memory or other memory technology, optical disk storage, magnetic cassettes, magnetic tape, magnetic disk storage or other magnetic storage devices, or any other medium that may be used to store the desired information and that may be accessed by processor 203.

Processor 203 may include a single central processing unit (CPU), which may be a single-core or multi-core processor, or may include multiple CPUs. Processor(s) 203 and associated components may allow the computing device 200 to execute a series of computer-readable instructions to perform some or all of the processes described herein. Although not shown in FIG. 2, various elements within memory 215 or other components in computing device 200, may include one or more caches, for example, CPU caches used by the processor 203, page caches used by the operating system 217, disk caches of a hard drive, and/or database caches used to cache content from database 221. For embodiments including a CPU cache, the CPU cache may be used by one or more processors 203 to reduce memory latency and access time. A processor 203 may retrieve data from or write data to the CPU cache rather than reading/writing to memory 215, which may improve the speed of these operations. In some examples, a database cache may be created in which certain data from a database 221 is cached in a separate smaller database in a memory separate from the database, such as in RAM 205 or on a separate computing device. For instance, in a multi-tiered application, a database cache on an application server may reduce data retrieval and data manipulation time by not needing to communicate over a network with a back-end database server. These types of caches and others may be included in various embodiments, and may provide potential advantages in certain implementations of devices, systems, and methods described herein, such as faster response times and less dependence on network conditions when transmitting and receiving data.

Although various components of computing device 200 are described separately, functionality of the various components may be combined and/or performed by a single component and/or multiple computing devices in communication without departing from the invention.

Figure 3:
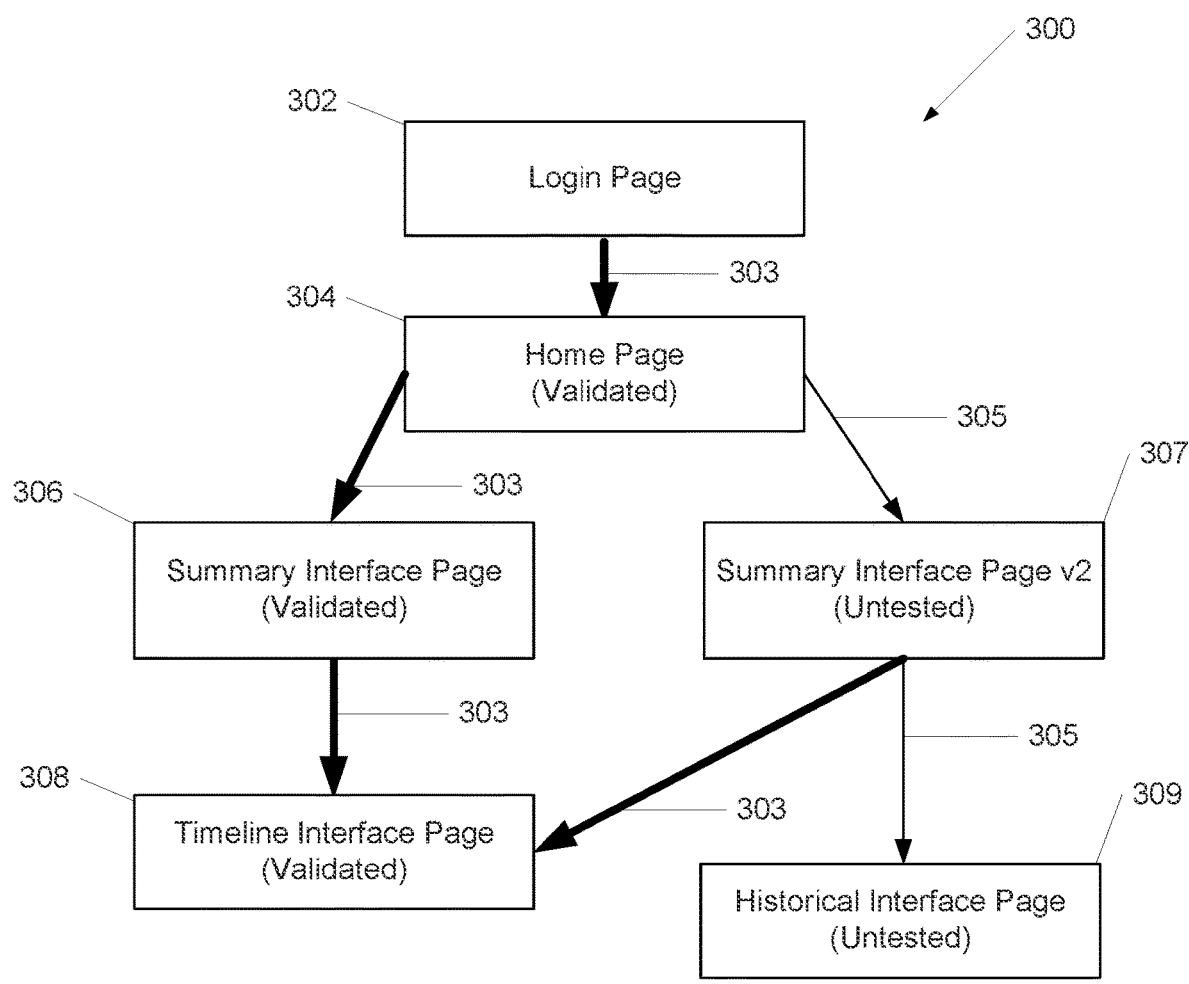
FIG. 3 depicts a conceptual diagram of a user interface flow in a mobile application according to one or more aspects of the disclosure described herein.

FIG. 3 depicts a conceptual diagram of a user interface flow in a mobile application according to one or more aspects of the disclosure. The mobile application may include a set of user interfaces. A user interface may have a set of functions for obtaining data input, process data, and/or transition to a different user interface. In several embodiments, based upon the received data input, another interface page may be displayed. The depicted mobile application 300 may include various interface pages each with a set of functions, and established transitions or flows between the interface pages. The bold arrows represent a pre-tested transition 303 from one interface page to another interface page. Unbolded arrows represent possible transitions 305 from one user interface to another that have not been tested. Some or all of the transitions 303 and 305 in the mobile application 300 may be performed using any of the computing devices and/or combination thereof described herein. In a variety of embodiments, some or all of the transitions described below may be combined and/or divided into sub-transitions as appropriate.

The mobile application 300 may include a set of interface pages and a set of transitions. Each transition 303 and 305 may define a transition from one interface page to another, as selected or requested via the mobile application 300. At the user interface 302, a user login in a mobile application may be generated by a deployment server system and transmitted to a client device. At transition 303, the homepage user interface 304 may be automatically transmitted by the deployment server system after login. The transition 303 from the interface page at 302 to the homepage user interface at 304 is depicted in a bolded arrow to signify that the automatically generated homepage user interface has successfully been validated using a set of unit tests and may be transmitted by the deployment server system. In some cases, the validated interface page may be transmitted to a mobile device.

At user interface 304, a transition to the user interface at 306 is received by input collected from the homepage at 304. For example, a requested transition to a bank account summary page (i.e., a summary interface page 306) is received by the mobile application 300. Again, the transition from the homepage at 304 to the summary interface page at 306 is validated prior to transmitting the summary interface page 306.

Alternatively, the selected function from the homepage 304 to transition 305 from the summary interface page 307 is not validated. Accordingly, the deployment server system may transmit an alternative version of the account summary interface page 307. The deployment server system may generate the alternative version of the interface page 307 as a result of a failed unit test and the deployment server system inability to validate the summary interface page requested and transmitted at 306. The deployment server system may also generate and transmit the alternative version of the interface page at 307 as a result of an inability of the deployment server system to generate an appropriate unit test in response to the selected transition 305.

At interface page 306, the deployment server system receives an input to transition to the account timeline interface page 308. Alternatively, the deployment server system receives an input to transition to the account timeline interface page 308 from the alternative user interface 307. The deployment server system may include a validated transition from the summary interface page at 306. The deployment server system is also capable of transmitting the validated selected interface page 308 from the alternative version of the interface page at 307.

Alternatively, at interface page 307 the requested transition is to proceed to the banking historical interface page 309. The selected transition from the alternative version of the summary interface page at 307 to the historical interface page at 309 is not pre-tested by the deployment server system. Accordingly, the deployment server system may generate the appropriate unit test and validate the historical interface page in real time prior to transmitting the validated historical interface page at 309.

Figure 4:
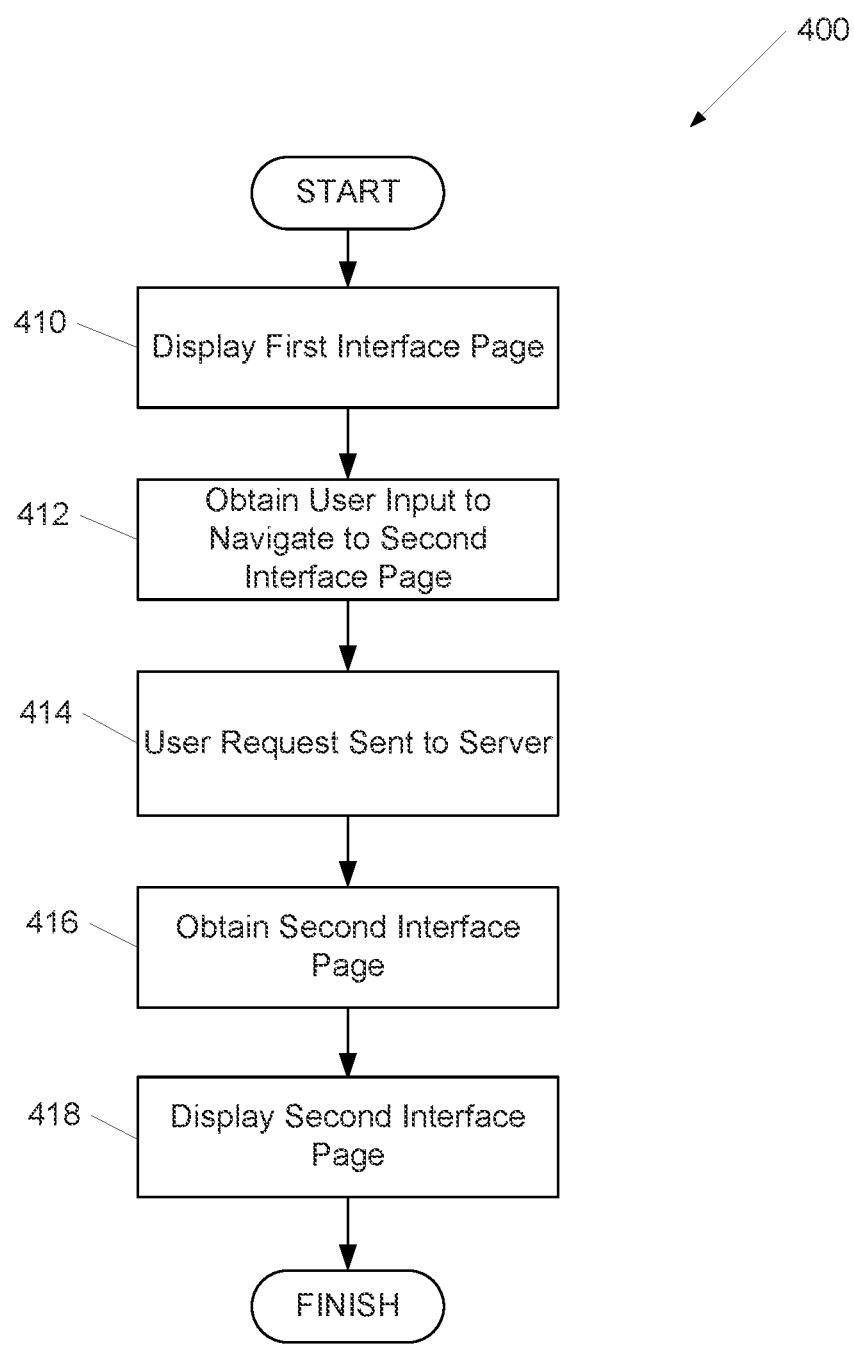
FIG. 4 depicts a flow chart for transitioning from an interface page in a mobile application to another interface page that is dynamically generated according to one or more aspects of the disclosure.

FIG. 4 depicts a flow chart for transitioning from an interface page in a mobile application to another interface page that is dynamically generated according to one or more aspects of the disclosure. Some or all of the steps of process 400 may be performed using any of the computing devices and/or combination thereof described herein. In a variety of embodiments, some or all of the steps described below may be combined and/or divided into sub-steps as appropriate.

At step 410, a deployment server system transmits a first interface page to a mobile device. As previously discussed the mobile application may include a set of user interfaces and the user interfaces may include a set of functions for obtaining data input and processing data. Some of the functions of the interface page may define one or more workflow steps for transitioning from one interface page to another. Each workflow step may define a transition from one particular interface page to another requested interface page. The transition may include a variety of parameters or other data provided from the first interface page to the requested interface page. The first interface page transmitted at step 410 may include at least one workflow step function to obtain an input to navigate to a second interface page.

At step 412, the deployment server system obtains an input data from a mobile device requesting navigation to a different interface page. The particular workflow step request may include a transition from the current interface page and associated transition data collected from the current interface page to a different interface page. In some examples, the interface page transmitted by the deployment server system may be based upon specific user data such as user preferences, customer demographic information, time, date, and/or geographic location.

At step 414, the request is sent to the deployment server system. The deployment server system determines the appropriate interface page requested based upon the received input, to include the transition and transition data. Like the original interface page, the new interface page determined by the deployment server system may also include input data requirements. At step 416, a second interface page is obtained. The deployment server system may determine the appropriate interface page as described in more detail with respect to FIG. 5.

At step 418, the new interface page may be displayed by the mobile application. Displaying the new user interface may include rendering or redrawing the user interface in response to the received input or event. The obtained input may be in the form of shapes, expressions, symbols, handwriting, touch, pressure, etc. In one example, a pen or other device may be used to touch, contact, depress, or otherwise interact with a screed displaying the user interface in order to provide input to a mobile device. In another example, a user's finger may be used to touch, contact, depress, or otherwise interact with the screen displaying the user interface in order to provide input to the mobile device. The new user interface may display colors, shapes, letters, or the like to communicate output information to a user of the mobile device. In still other examples, the user interface may include other interfaces, such as keyboards, mice, switches, buttons, microphones, cameras, motion detection, etc. that further enable a user to input data into the mobile device. In still other examples, a camera associated with the user interface may detect a user's gestures and interpret the gestures as a form of input data obtained by the deployment server system. In other examples, the camera and the user interface may be associated with an augmented reality device and/or a virtual reality device. In some examples, the user interface may further include speakers, vibration components, projector components, or combinations thereof.

Figure 5:
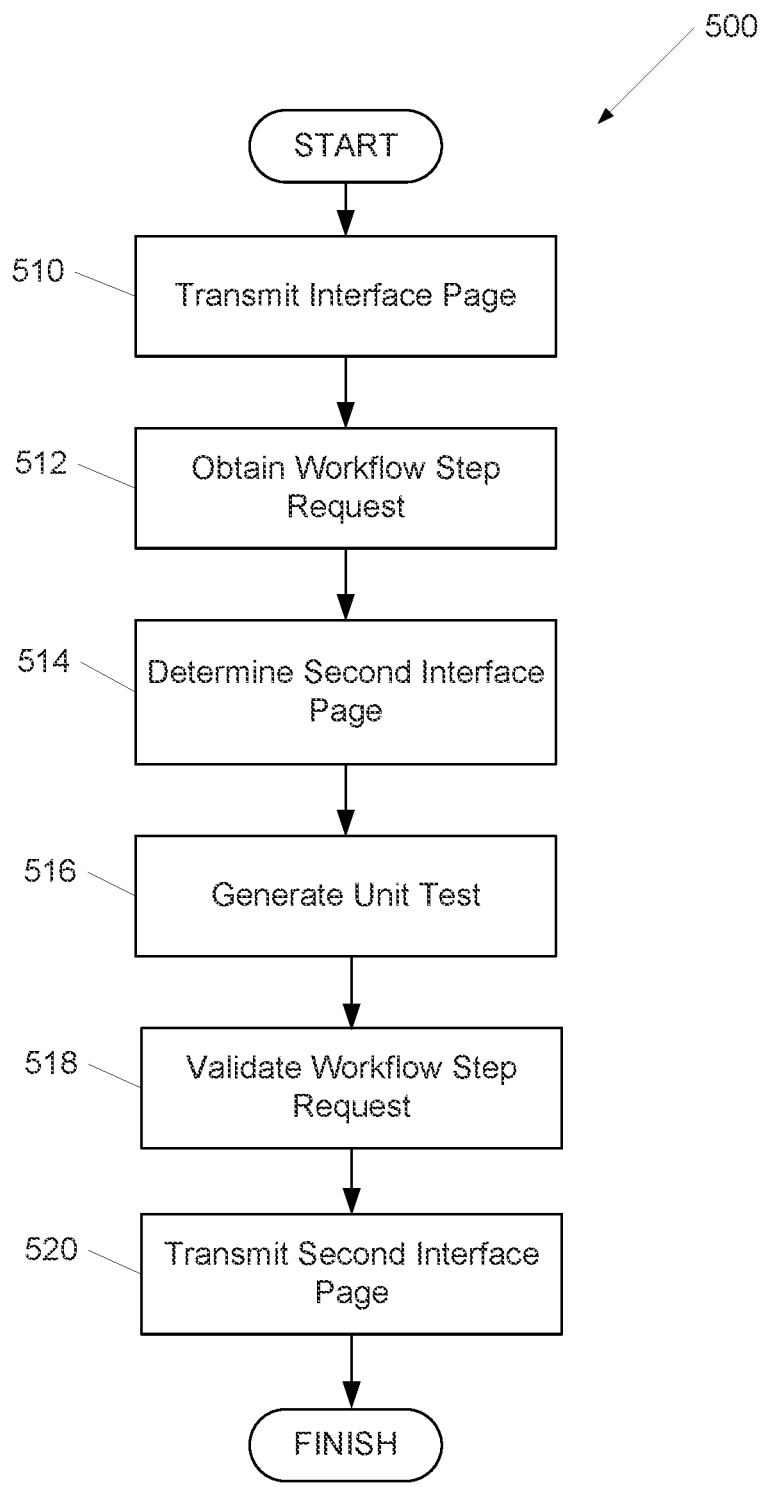
FIG. 5 depicts a flow chart for dynamically generating a user interface that is validated according to one or more aspects of the disclosure.

FIG. 5 depicts a flow chart for dynamically generating a user interface that is tested and validated at the back-end by the deployment server according to one or more aspects of the disclosure. Some or all of the steps of process 500 may be performed using the deployment server system described herein. In other examples, some or all of the steps of process 500 may be performed using any of the other computing devices and/or combination thereof described herein. In a variety of embodiments, some or all of the steps described below may be combined and/or divided into sub-steps as appropriate.

At step 510, the deployment server system may transmit a first interface page to a mobile device. The first interface page transmitted at step 510 may include at least one user interface element that indicates a transition to a different interface page based on received input data as described herein. The indicated transition in the displayed interface page may correspond to one or more functions provided by the first interface page. Each function may use one or more arguments that indicate data to be provided when calling the function. The indicated data may be provided by the first interface page and/or determined based on input data received by the first interface page.

At step 512, the deployment server system obtains a workflow step request from a mobile device. The workflow step request may indicate a requested action provided by the first interface page. The workflow step request may include data indicating a request to navigate to a different interface page. The workflow step request may indicate one or more functions provided by the first interface page and/or the data satisfying the indicated functions.

At step 514, the deployment server system determines the second interface page. The second interface page may be determined based on the workflow step request. In several embodiments, the second interface page is indicated based on data in the workflow step request specifically identifying the second interface page, such as a uniform resource locator (URL). In a variety of embodiments, the second interface page may be determined based on the data, such as the argument data, provided in the workflow step request. For example, the argument data may indicate that a "view account page" is being requested and a lookup table may be used to map "view account page" to a view account page interface page.

At step 516, the deployment server system may generate a unit test for the second interface page. The unit test may be pre-generated and/or generated in real-time based on the workflow step request. The unit test may include one or more test functions. A test function may indicate one or more functions provided by the second interface page and function input data to be used when invoking the function provided by the second interface page. The function input data may be randomly generated and/or determined based on data provided in the workflow step request as appropriate.

At step 518, the deployment server system may validate the workflow step request for the second interface page. The workflow step request may be validated for the second interface page when the generated unit test may be successfully executed against the second interface page. That is, the workflow step request may not be validated when the unit test fails. A unit test may be successfully executed when all tests provided by the unit test are performed without any error codes being generated by the tests or the interface pages. A unit test may fail when one or more errors are generated during the execution of the tests. In several embodiments, the generated errors may indicate a portion of the workflow step request and/or interface pages that may be modified to cause the unit test to pass on further execution.

At step 520, the second interface page may be transmitted. The second interface page may be transmitted to the computing device providing the workflow step request and/or to any computing device indicated in the workflow step request. In a variety of embodiments, the second interface page is transmitted after validating the workflow step request. The new interface page may be transmitted by the deployment server system to a mobile device or a content delivery network. In a number of embodiments, the content delivery network may transmit the second interface page to a mobile device. In several embodiments, the deployment server system may transmit the new interface page without redeploying the mobile application.

In many embodiments, the interface pages may include a web page. In a variety of embodiments, the deployment server system may operate across various programming languages. For example, the deployment server system may receive a workflow step request in a first language, but determine another interface page in a second language. The deployment server system may also generate and transmit the determined interface page in yet a third language. The deployment server system described herein may operate across multiple types of programming languages to include interpreted programming languages, functional programming languages, compiled programming languages, procedural programming languages, scripting programming languages, markup programming languages, logic-based programming languages, concurrent programming languages, object-oriented programming languages, and/or any other language as appropriate.

Figure 6:
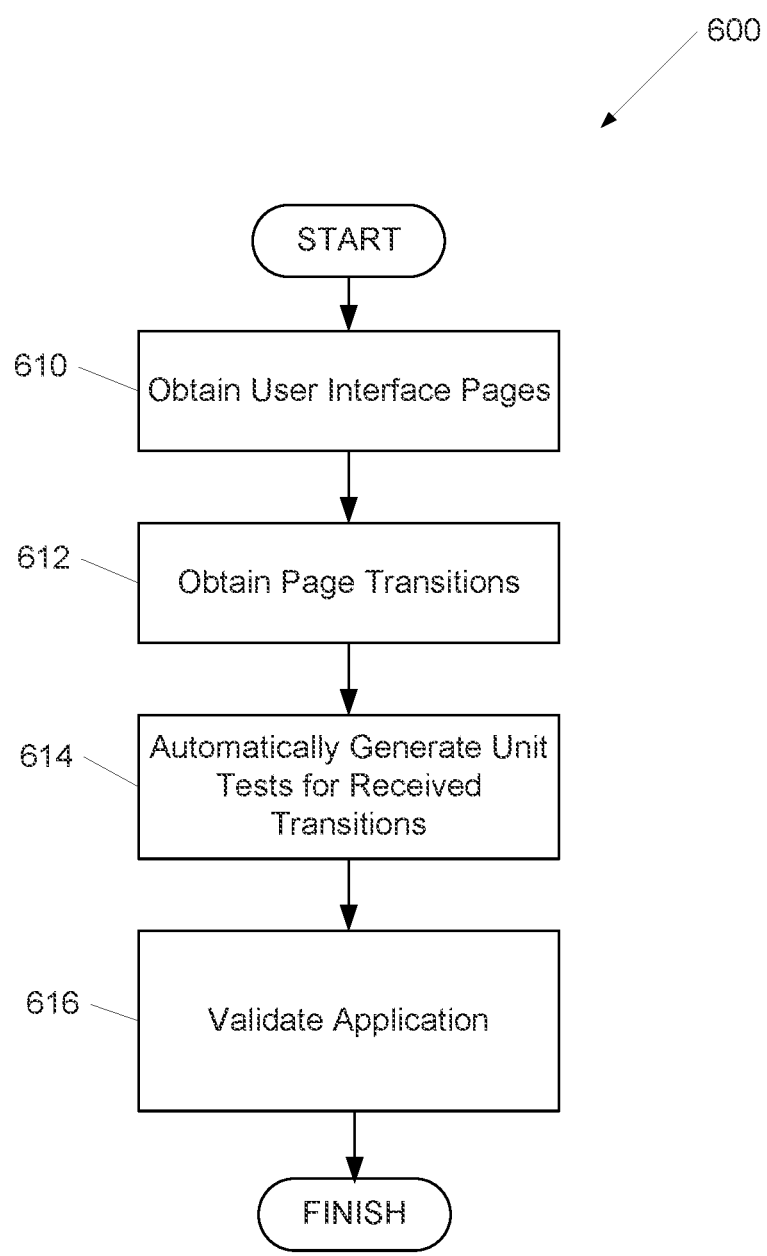
FIG. 6 depicts a flow chart for generating a unit test for an application including a set of pages and a set of transitions between pages according to one or more aspects of the disclosure.

FIG. 6 depicts a flow chart for generating a unit test for an application that may include a set of interface pages and a set of transitions between the interface pages according to one or more aspects of the disclosure. Some or all of the steps of process 600 may be performed using the deployment server system described herein. In other examples, some or all of the steps of process 600 may be performed using any of the other computing devices and/or combination thereof described herein. In a variety of embodiments, some or all of the steps described below may be combined and/or divided into sub-steps as appropriate.

At step 610, a set of interface pages may be obtained. A deployment server system may obtain the set of interface pages from one or more developer devices, databases, and/or other sources of data as appropriate. The interface pages may each include various user interface elements that indicate a set of transitions between the set of interface pages based on received input data as described herein interface page. The indicated transitions in the set of interface pages may correspond to one or more functions provided by the set of interface pages. As described herein, each function may use one or more arguments that indicate data to be provided when calling the function. The indicated data may be provided by the set of interface pages and/or determined based on input data received by the set of interface pages.

At step 612, a set of page transitions may be obtained. The set of page transitions may be received by the deployment server system from one or more developer devices, databases, and/or other sources of data as appropriate. The set of transitions may include data indicating a request to navigate to a different set of interface pages. The set of page transitions may correspond to one or more user interface elements and/or functions provided by the interface pages. In several embodiments, a page transition may be used to modify an interface page to display some or all of the user interface elements available in the interface page. In this way, the set of page transitions may be used to dynamically define a particular flow through the various interface pages in the set of interface pages.

At step 614, the deployment server system may automatically generate unit tests for the page transitions and corresponding set of interface pages. As described herein, the unit tests may be pre-generated and/or generated in real-time based on the indicated set of transitions that may be based on received input. The data may be provided by the set of interface pages and/or determined based on anticipated input data received by the set of interface pages. The unit tests may include one or more test functions. The test functions may indicate one or more functions provided by the set of transitions between the interface pages and the function input data to be used when invoking the function provided by the set of interface pages. The function input data may be randomly generated and/or determined based on data provided in the received set of transitions as appropriate.

At step 616, an application may be validated. The application may include the interface pages and the set of transitions. The application may be validated when the generated unit tests for the interface pages and the set of transitions pass. The deployment server system may validate the received set of transitions between the set of interface pages. The received set of transitions between interface pages may be validated when the automatically generated unit tests may be successfully executed against the requested set of interface pages. The received set of transitions may not may not be validated when the unit tests fail.

Figure 7:
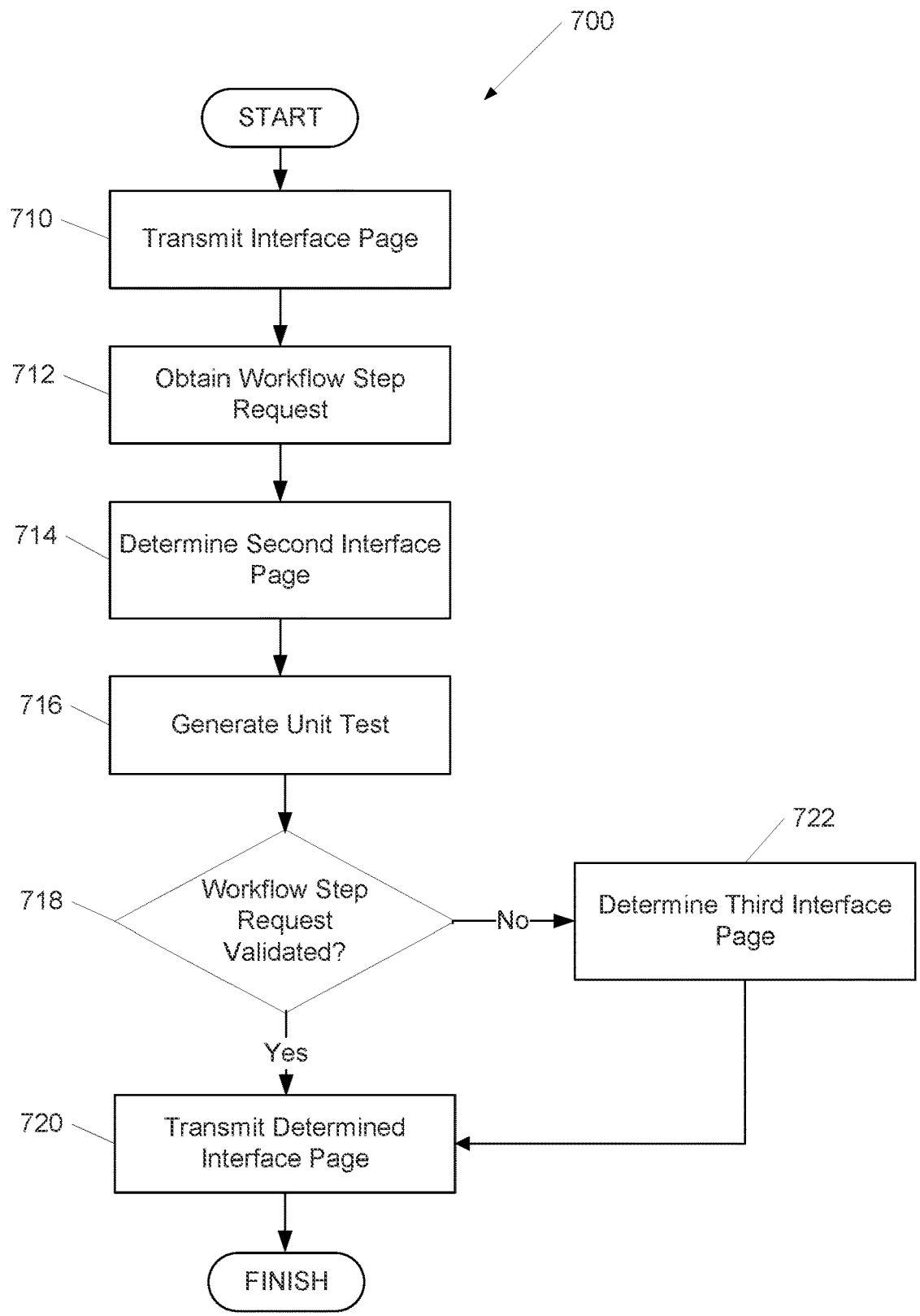
FIG. 7 depicts a flow chart for dynamically generating a requested user interface that is successfully validated according to one or more aspects of the disclosure.

FIG. 7 depicts a flow chart for dynamically generating a requested user interface that is validated according to one or more aspects of the disclosure. Some or all of the steps of process 700 may be performed using the deployment server system described herein. In other examples, some or all of the steps of process 700 may be performed using any of the other computing devices and/or combination thereof described herein. In a variety of embodiments, some or all of the steps described below may be combined and/or divided into sub-steps as appropriate.

At step 710, an interface page may be transmitted. The interface page may be transmitted from a deployment server system to a mobile device. The interface page may cause one or more user interfaces to be displayed by an application executing on the mobile device. The displayed user interfaces may obtain a variety of input data as described herein.

At step 712, the deployment server system obtains a workflow step request from a mobile device. The workflow step request may indicate a requested action provided by the first interface page. The workflow step request may include data indicating a request to navigate to a different interface page. The workflow step request may indicate one or more functions provided by the first interface page and/or the data satisfying the indicated functions.

At step 714, the deployment server system may determine a second interface page. The second interface page may be determined based on the workflow step request. In several embodiments, the second interface page is indicated based on data in the workflow step request specifically identifying the second interface page, such as a uniform resource locator (URL). In a variety of embodiments, the second interface page may be determined based on the data, such as the argument data, provided in the workflow step request. For example, the argument data may indicate that a "view account page" is being requested and a lookup table may be used to map "view account page" to a view account page interface page.

At step 716, the deployment server system may generate a unit test for the second interface page. The unit test may be pre-generated and/or generated in real-time based on the workflow step request. The unit test may include one or more test functions. A test function may indicate one or more functions provided by the second interface page and function input data to be used when invoking the function provided by the second interface page. The function input data may be randomly generated and/or determined based on data provided in the workflow step request as appropriate.

At step 718, a decision is made as to whether the workflow step request was successfully validated. Upon passing the generated unit test, the deployment server system may validate the workflow step request for the second interface page. The deployment server system may validate the workflow step request for the second interface page. The workflow step request may be validated for the second interface page when the generated unit test may be successfully executed against the second interface page.

At step 720, the second interface page may be transmitted upon successful validation of the workflow step request for the second interface page. The second interface page may be transmitted to the computing device providing the workflow step request and/or to any computing device indicated in the workflow step request. In a variety of embodiments, the second interface page is transmitted after validating the workflow step request. The new interface page may be transmitted by the deployment server system to a mobile device or a content delivery network. In a number of embodiments, the content delivery network may transmit the second interface page to a mobile device. In several embodiments, the deployment server system may transmit the new interface page without redeploying the mobile application.

Returning to step 718, the workflow step request may not be validated when the unit test fails. If the deployment server system unsuccessfully validates the workflow step for the second interface page, the deployment server system may determine a third interface page.

At step 722, the deployment server system may automatically determine a third interface page when the workflow step request for the second interface page is not validated. The deployment server system may then transmit the third interface page at step 720 as a result of not being able to successfully validate the workflow step request for the second interface page at step 718. The third interface page may be transmitted to the computing device providing the workflow step request and/or to any computing device indicated in the workflow step request. In other embodiments, the third interface page may be pre-validated. The third interface page may be transmitted by the deployment server system to a mobile device or a content delivery network. In still other embodiments, the content delivery network may transmit the third interface page to a mobile device. In a variety of embodiments, the deployment server system may transmit the third interface page without redeploying the mobile application.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, and the like that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid-state memory, RAM, and the like. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a system, and/or a computer program product.

Although the present invention has been described in certain specific aspects, many additional modifications and variations would be apparent to those skilled in the art. In particular, any of the various processes described above may be performed in alternative sequences and/or in parallel (on different computing devices) in order to achieve similar results in a manner that is more appropriate to the requirements of a specific application. It is therefore to be understood that the present invention may be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A system comprising:
    at least one processor; and
    a memory, wherein the memory is in communication with the at least one processor storing instructions that, when executed by the at least one processor, cause the at least one processor to:
    receive a transition request from at least one client device;
        wherein the transition request comprises:
            a first interface page displayed on the at least one client device,
            a second interface page indication for a second interface page that is requested to be displayed on the at least one client device, and
            at least one second interface page input data requirement for the second interface page;
        determine a second interface page validation status of the second interface page, wherein the second interface page validation status identifies when the second interface page is pre-validated according to a prior second interface page unit test so that the second interface page validation status is validated or unvalidated;
    generate, automatically and in response to the second interface page validation status being unvalidated, a current second interface page unit test for the second interface page to test at least one second interface page function of the second interface page based on the at least one second interface page input data requirement;
    execute the current second interface page unit test against the second interface page to validate the at least one second interface page function of the second interface page before providing the second interface page to the at least one client device;
    determine a successful validation of the second interface page based on the current second interface page unit test;
    store the second interface page as a current validated second interface page; and
    transmit the current validated second interface page to the at least one client device in response to the transition request for display on the at least one client device upon a transition from the first interface page.

2. The system of claim 1, wherein the current validated second interface page is transmitted to the at least one client device.

3. The system of claim 1, wherein the current validated second interface page is deployed to a content delivery network, and wherein the content delivery network is configured to transmit the current validated second interface page to the at least one client device.

4. The system of claim 1, wherein the second interface page is determined based on criteria selected from a group consisting of a customer demographic information, a time, and a geographic location.

5. The system of claim 1, wherein the second interface page is based on criteria selected from a group consisting of a data present in a at least one client device account and a capability of the at least one client device.

6. The system of claim 1, wherein the first interface page and the transition request are associated with a user interface workflow of a mobile application.

7. The system of claim 1, wherein the first interface page and the transition request are associated with a user interface workflow of a web page.

8. The system of claim 1, wherein the instructions, when executed by the at least one processor, further cause the system to:

receive the transition request in a first programming language;
identify the current validated second interface page in a second programming language; and
generate and transmit the current validated second interface page in the first programming language.

9. The system of claim 1, wherein the instructions, when executed by the at least one processor, further cause the system to:
receive a second transition request from the at least one client device;
wherein the second transition request comprises:
the current validated second interface page displayed on the at least one client device,
a third interface page indication for a third interface page to be displayed on the at least one client device and
at least one third interface page input data requirements for the third interface page;
determine a third interface page validation status of the requested third interface page, wherein the third interface page validation status identifies when the third interface page is pre-validated according to a prior third interface page unit test so that the second interface page validation status is validated or unvalidated;
generate, automatically and in response to the third interface page validation status being unvalidated, a current third interface page unit test for the third interface page to test at least one third interface page function of the third interface page based on the at least one third interface page input data requirement;
determine an unsuccessful validation of the third interface page based on the current third interface page unit test;
determine a pre-validated alternative third interface page associated with the at least one third interface page function; and
transmit the pre-validated alternative third interface page to the at least one client device in response to the transition request for display on the at least one client device upon a transition from the current validated second interface page.

10. A method for dynamically generating a user interface, comprising:
receiving, by at least one processor, a transition request from at least one client device;
wherein the transition request comprises:
a first interface page displayed on the at least one client device,
a second interface page indication for a second interface page that is requested to be displayed on the at least one client device and
at least one second interface page input data requirement for the second interface page;
determining, by the at least one processor, a second interface page validation status of the second interface page, wherein the second interface page validation status identifies when the second interface page is pre-validated according to a prior second interface page unit test so that the second interface page validation status is validated or unvalidated;
generating, by the at least one processor automatically and in response to the second interface page validation status being unvalidated, a current second interface page unit test for the second interface page to test at least one second interface page function of the second interface page based on the second interface page input data requirements;
executing, by the at least one processor, the current second interface page unit test against the second interface page to validate the at least one second interface page function of the second interface page before providing the second interface page to the at least one client device;
determining, by the at least one processor, a successful validation of the second interface page based on the current second interface page unit test;
store the second interface page as a current validated second interface page; and
transmitting, by the at least one processor, the current validated second interface page to the at least one client device in response to the transition request for display on the at least one client device upon a transition from the first interface page.

11. The method of claim 10, wherein the current validated second interface page is transmitted to the at least one client device.

12. The method of claim 10, wherein the current validated second interface page is deployed to a content delivery network, and wherein the content delivery network is configured to transmit the current validated second interface page to the at least one client device.

13. The method of claim 10, further comprising determining, by the at least one processor, the second interface page based on criteria selected from a group consisting of a customer demographic information, a time, and a geographic location.

14. The method of claim 10, further comprising determining, by the at least one processor, the second interface page based on criteria selected from a group consisting of a data present in a at least one client device account and a capability of the at least one client device.

15. The method of claim 10, wherein the second interface page and the transition request are associated with a user interface workflow of a mobile application.

16. The method of claim 10, and the transition request are associated with a user interface workflow of a web page.

17. The method of claim 10, further comprising:
obtaining, by the at least one processor from a at least one client device, the transition request in a first programming language;
identifying, by the at least one processor, the current validated second interface page in a second programming language; and
generating, by the at least one processor, the current validated second interface page in the first programming language;
transmitting, by the at least one processor, the current validated second interface page in the first programming language.

18. A non-transitory machine-readable medium storing instructions that, when executed by at least one processor, cause the at least one processor to perform steps comprising:
receiving a transition request from at least one client device;
wherein the transition request comprises:
a first interface page displayed on the at least one client device,
a second interface page indication for a second interface page to be displayed on the at least one client device and
at least one second interface page input data requirement for the second interface page;
determining a second interface page validation status of the requested second interface page, wherein the second interface page validation status identifies when the second interface page is pre-validated according to a prior second interface page unit test so that the second interface page validation status is validated or unvalidated;

generating, automatically and in response to the second interface page validation status being unvalidated, a current second interface page unit test for the second interface page to test at least one second interface page function of the second interface page based on the at least one second interface page input data requirement;

executing the current second interface page unit test against the second interface page to validate the at least one second interface page function of the second interface page before providing the second interface page to the at least one client device;

determining a successful validation of the second interface page based on the current second interface page unit test;

storing the second interface page as a current validated second interface page; and transmitting the current validated second interface page to the at least one client device in response to the transition request for display on the at least one client device upon a transition from the first interface page.

19. The non-transitory machine-readable medium of claim 18, wherein the instructions further cause the at least one processor to perform steps comprising:

obtaining the first interface page in a first programming language;

identifying the current validated second interface page in a second programming language;

generating the current validated second interface page in the first programming language; and transmitting the current validated second interface page in the first programming language.

20. The non-transitory machine-readable medium of claim 18, wherein the first interface page and the current validated second interface page are associated with a mobile application; and wherein the instructions further cause the at least one processor to perform steps comprising transmitting the current validated second interface page without redeploying the mobile application.

\* \* \* \* \*